(12) United States Patent
Crawford

(10) Patent No.: US 8,069,803 B1
(45) Date of Patent: Dec. 6, 2011

(54) BOAT TILLER RESTRAINING DEVICE

(76) Inventor: Peter James Crawford, Chapel Hill, NC (US)

( * ) Notice: Subject to any disclaimer, the term of this patent is extended or adjusted under 35 U.S.C. 154(b) by 267 days.

(21) Appl. No.: 12/547,461

(22) Filed: Aug. 25, 2009

(51) Int. Cl.
*B63H 25/00* (2006.01)
*A44B 1/04* (2006.01)
*A44B 11/25* (2006.01)
*A44B 17/00* (2006.01)
*F16G 11/00* (2006.01)
*B63H 25/10* (2006.01)
*B63H 25/04* (2006.01)
*B63H 25/34* (2006.01)

(52) U.S. Cl. .................. 114/172; 114/144 R; 114/170; 24/132 R; 24/133

(58) Field of Classification Search .................. 114/172, 114/221 R, 144 R, 223, 199, 218; 24/132 R, 24/133, 134 R, 134 KA, 134 KB, 134 L, 24/134 N, 134 P, 132 AA, 132 WL, 115 G, 24/135 R
See application file for complete search history.

(56) References Cited

U.S. PATENT DOCUMENTS

| | | | |
|---|---|---|---|
| 911,460 A | 2/1909 | Tiley | |
| 2,846,896 A | 8/1958 | Allen | |
| 3,279,410 A | 10/1966 | Young | |
| 4,080,918 A * | 3/1978 | Bonhard | 114/172 |
| 4,178,869 A | 12/1979 | Turrentine | |
| 4,188,904 A | 2/1980 | Childress | |
| 4,193,318 A | 3/1980 | Golobay | |
| 4,241,684 A * | 12/1980 | Davis | 114/144 R |
| 4,278,042 A | 7/1981 | Lindquist | |
| 4,288,891 A | 9/1981 | Boden | |
| 4,328,605 A | 5/1982 | Hutchison | |
| 4,413,382 A | 11/1983 | Siegmann | |
| 4,450,603 A | 5/1984 | Hirsch | |
| 4,476,800 A | 10/1984 | Gage | |
| 4,480,572 A | 11/1984 | Lauterbach | |
| 5,052,321 A | 10/1991 | Toniatti | |
| 5,133,274 A | 7/1992 | Grant | |
| 5,279,020 A | 1/1994 | Coe | |
| 5,335,616 A | 8/1994 | Tiesler | |

OTHER PUBLICATIONS

Davis Instruments Corp, Hayward, California US, Item: "Tiller-Tamer™" Web Site: http://www.davisnet.com/marine/products/marine_product.asp?pnum=02205.
Badbury Tillermate Limited, Dorset, UK, Item: "Tillermate" Web Site: http://www.tillermate.com/.
Cansail Marine Supplies, Welland, Ontario, CA, Item: "Tillerlock" Web Site: http://www.cansail.com/index.htm.

* cited by examiner

*Primary Examiner* — Daniel Venne
*Assistant Examiner* — Anthony Wiest

(57) ABSTRACT

An improved tiller restraining device is provided for attachment to the underside of a boat's tiller to selectively control the position of the tiller and rudder. The device features a specialized mechanical clutch that grips or releases a control rope, which runs through the clutch and is secured across the cockpit. The device is operated with one hand by moving an integrated clutch lever upward to release the rope and allow free tiller movement, or downward to engage the rope and restrict tiller movement. Inside the device, a spring acts on the lever to pinch and bind the rope against the openings where the rope passes through the clutch housing. The spring and lever are aligned so they toggle, enabling the clutch to remain either engaged or disengaged with no additional controls.

12 Claims, 3 Drawing Sheets

BOAT TILLER RESTRAINING DEVICE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention generally relates to the steering of boats, specifically to an improved mechanical device that allows a single-handed pilot to quickly and easily restrain the position of the tiller and rudder at the stern of a boat.

2. Prior Art

Most smaller boats, especially sailboats, are steered with a rudder at the stern that is pivoted by a long arm called a tiller. The tiller extends into the steering area, or cockpit, for the sailor or pilot to use.

When steering a boat single handedly, a sailor often needs to momentarily release the tiller to attend to other critical tasks, including changing sails, adjusting lines, preparing anchors, and retrieving needed articles from elsewhere on the boat. Without some method of restricting tiller movement, the rudder can quickly swing to one side or the other, causing the boat to veer off course with undesirable results. Conversely, with the tiller fixed in position, the boat may remain on course long enough for the sailor to complete a necessary task.

Sailors have addressed this problem in the past with varying degrees of success. Numerous solutions have been tried, ranging from elaborately-tied ropes or elastic cords to rods and clamps. A few simple cord-based devices have been patented as shown by U.S. Pat. No. 4,480,572 to Lauterbach (1984) and U.S. Pat. No. 5,335,616 to Tiesler (1994). The difficulty with these devices is that they occupy two hands for set-up or adjustment, and they cannot be released quickly or intuitively when necessary. Unfortunately, in windy, foul-weather or crowded conditions the ability to make a quick-steering adjustment can be crucial.

A number of rigid tiller restraining designs have been disclosed in U.S. Pat. No. 2,846,896 to Allen (1958), U.S. Pat. No. 3,279,410 to Young (1966), U.S. Pat. No. 4,178,869 to Turrentine (1979), U.S. Pat. No. 4,188,904 to Childress (1980), U.S. Pat. No. 4,476,800 to Gage (1984), U.S. Pat. No. 5,052,321 to Toniatti (1991), and U.S. Pat. No. 5,133,274 to Grant (1992). These devices employ a rod or wooden stick with one end mounted to a side of the boat and the other end adjustably attached to the tiller to hold it in position. Though somewhat effective, each of these contraptions would prove cumbersome and awkward to use within the crowded confines of smaller-sized boats that typically use tillers for steering. In particular, they can obstruct the use of several important ropes that require frequent monitoring within the cockpit. Additionally, when not in use, these awkward devices consume precious cockpit storage space, and they present an unsightly, incongruent effect on the neat lines of a sailing craft.

The more practical tiller control solutions employ a more compact mechanical device that is attached to the tiller and engages a small control rope strung across the steering area. The control rope is positioned so that the tiller glides along it when steering. The device restricts tiller movement by gripping the control rope at any chosen location along the arc of the tiller. Several such devices have been developed by others, but each has its shortcomings.

The majority of these products employ a tensioning spring-and-screw combination that applies friction directly to the control rope as it winds its way through the device. A few versions of similar design appear to be in the public domain including the Tiller-Tamer™ by Davis Instruments Corp (www.davisnet.com). Such a device can be useful, but has several disadvantages. First, it takes time to activate, as the knob must be rotated several turns to engage or disengage the control rope. For unrestricted steering, the user must fully unscrew the knob, thereby loosing any desired friction on the control rope. Often frustrated by this operational requirement, the user tends to leave the knob partially tightened and simply overpowers it for every steering adjustment. This use tends to wear on the control rope and allow the device to slip under normal water pressures acting upon the rudder. Even with the screw fully loosened, significant friction remains on the control rope as it rounds the three bends required by the tensioning apparatus. This friction detracts from the pleasurable feel of freely steering the boat. It also masks the natural feedback that the sailor feels from rudder pressures. This feedback is important for the sailor when trimming sails for varying conditions. Furthermore, the tensioning knob protrudes from the top of the device, where it has been known to dangerously snag critical ropes during quick sailing maneuvers.

To address some of these issues, U.S. Pat. No. 4,080,918 to Bonhard (1978) shows a device which uses a hinged clamp to grip the control rope as it passes directly through it. This improved simple mechanism allows for faster engaging and complete releasing of the control rope, and it retains a predetermined rope friction when disengaged. However, this product also falls short. The pilot must use one hand to engage it, while using the other hand to steer. Therefore, two hands and visual attention are required when attempting quick steering adjustments. This requirement can detract from the pilot's focus on boat direction, sails, etc. at a time when all are impacted by the steering action taken. Additionally, when disengaged, the hinged clamp part swings awkwardly away from the tiller, where it can snag the main sheet rope as with the previously mentioned device. This extended part can present a scraping hazard to the user, and can badly pinch a finger when closed in a hurry.

U.S. Pat. No. 4,241,684 to Davis (1980) discloses a device that addresses some of these issues in a unique, though problematic way. This device employs a set of opposing friction-operated cams to engage the control rope. One of the cams can tighten on the control rope in opposition to rope tension from the other side. The other cam performs the reverse action, so that the rope is restrained in both directions. A remotely located bicycle brake-type lever is provided with a cable to release the cams and free the control rope. Conceptually, this appears to be an improvement, since little effort is needed to engage the rope and the rope cannot slip from increased pressure on the tiller. However, in practice, this increasing grip could be hazardous because the cams would not yield to excessive rudder forces that could cause rudder failure. Likewise, a pilot could not overpower the device in an emergency. Furthermore, increasing tension on the control rope would make the cams increasingly difficult for the lever to disengage. To counter this release problem, the pilot would have to carefully offset any significant rudder load on the tiller before using the release lever. This requirement would diminish the convenience of the device and could slow steering reaction time. Finally, installation of the product onto the tiller is complicated by the attachment of the two separate components that require careful alignment for proper operation.

Other previous mechanical tiller restraining devices were not included in this discussion, but each of them attempts to provide a useful means of restraining the tiller while it is momentarily unattended. Nevertheless, each previous device fails to provide a fully satisfactory solution with regard to efficiency, convenience and safety, having several of the following disadvantages:

(a) Both hands are occupied to operate the device while steering.

(b) The operator must focus attention on the device to locate it and to operate it effectively.

(c) The device does not lend itself to one-handed, minor steering corrections while in use.

(d) Working the device requires repeated or complex hand motions to rotate an adjustment knob or work a clamp.

(e) The device restrains the tiller too securely, so the tiller cannot be forced by hand pressure, and will not yield to excessive underwater rudder pressure.

(f) An upwardly-protruding part of the device can entangle operating lines on the boat, and can present a hazard to the user.

(g) Residual friction in the control rope effects steering feel when the device is disengaged.

(h) Rigid poles or rods of the device are cumbersome and consume limited storage space when not in use.

(i) The mechanism presents a pinching hazard to the user.

(j) The device is ungainly and unpleasing to the eye.

Some of these disadvantages represent inconveniences, while others can slow reaction time and hinder boat operation, or become hazardous in rough conditions.

3. Objects and Advantages

Accordingly, several objects and advantages of the present invention are:

(a) To provide a tiller restraining device that is integrated into the normal steering position for one-handed operation, so that the pilot can grip the tiller handle and simultaneously restrict or un-restrict tiller movement;

(b) To provide a tiller restraining device that is intuitive in use, not requiring extra thought or wasted motion;

(c) To provide a tiller restraining device that allows one-handed, momentary release the for minor steering corrections;

(d) To provide a tiller restraining device that will instantly engage or release the control rope with a small motion of the fingers, even under load;

(e) To provide a tiller restraining device that can be predictably overpowered for emergencies, yet will not slip under normal working loads;

(f) To provide a tiller restraining device with a low profile that is secured beneath the tiller without upwardly protruding parts that could otherwise snag important sailboat lines, or cause a safety hazard;

(g) To provide a tiller restraining device that allows nearly frictionless steering when disengaged;

(h) To provide a tiller restraining device that is compact and can be permanently installed without taking up valuable space during use or storage;

(i) To provide a tiller restraining device that will not pinch the user's hand with normal use.

(j) To provide a tiller restraining device that is unobtrusive and aesthetically pleasing.

Further objects and advantages will become apparent from a consideration of subsequent description and drawings.

SUMMARY

In accordance with the present invention, a novel tiller restraining device is offered for boats steered with a conventional tiller arm. The heart of the device is a compact, spring-powered rope clutch attached to the underside of the tiller for selectively restraining it in any position along its arc of travel. The device places a small integral lever within the grasp of the pilot's hand. With this lever, the pilot can easily toggle the clutch mechanism to grip or release a control rope that passes through it and is fastened across the steering area of the boat. With a quick click, the tiller is either secured in place via rope friction, or released for free movement. Compared to the prior art, this invention exhibits improved speed, safety, efficiency, convenience, and aesthetics. In addition, the simplicity and minimal force required to operate it makes it user-friendly.

DRAWINGS

Figures

DRAWINGS

Reference Numerals

Figure 1:
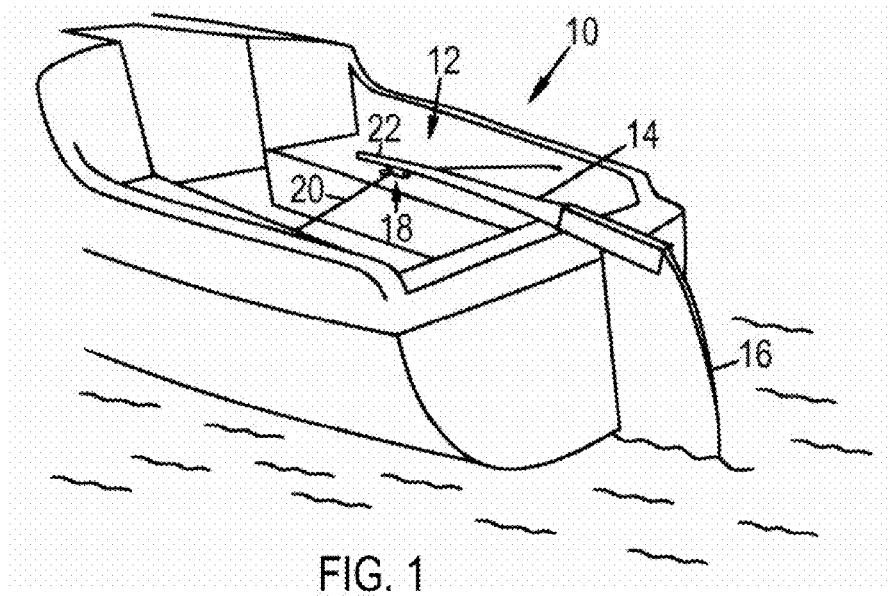
FIG. 1 is a partial perspective view of a boat showing the tiller restraining device installed and in use within the cockpit area of a boat.

10. Boat showing cockpit area with tiller restraining device installed-assembly
12. Cockpit area of boat
14. Tiller arm that controls the rudder
16. Rudder
18. Tiller Restraining Device-assembly
20. Control Rope
22. Handle section of tiller
24. Lever
24a Handle Arm of Lever 24
24b Load Arm of Lever 24
26. Rivet Pin through Block 44
28. Rivet Pin through Lever 24
30. Plastic Bushing
32. Mounting Screw
34. Circular Passage for Control Rope 20
36. Rounded Groove in mounting surface
38. Cutaway in Housing
40. Housing, hollow body
42. Rectangular Aperture extending through Housing 40
44. Spring Retaining Block
46. Flat Spring (shown edge-on)

48. "V" notch in Lever Load Arm 24b
50. Indexing Pin
52. "V" notch in Block 44
54. Mounting Screw Hole in Block 44
56. Mounting Screw Hole in Housing 40
58. Mounting Screw Hole in Housing 40
60. Slot through Lever Load Arm 24b for mounting screw
62. Shallow Recess in Lever Load Arm 24b
64. Slot in Block Part 40 to accept Rivet Pin 26
66. Protective Spring Seat in "V" Notch 48
68. Protective Spring Seat in "V" Notch 52
70. Screw Knob
72. Adjustable Spring Retaining Block
74. Widened Screw Slot
76. Back Wall in Housing
78. "V" Notch in Block 72
80. Screw Knob
82. Spring Support Notch
84. Spring Support Notch
86. Stop Notch in Lever 24
88. Stop Pin
90. Spring
92. Stop Pawl
94. Spring
96. Housing, modified
98. Lever modified from preferred Lever 24

DETAILED DESCRIPTION

Preferred Embodiment—FIGS. 1, 2, 3, 4 and 5

A preferred embodiment of the present boat tiller restraining device 18 is generally illustrated in perspective view FIG. 1. A sailboat 10 having a cockpit 12 is equipped with a pivotally mounted rudder 16 to control the direction of travel. The rudder 16, in turn, is controlled by a tiller arm 14 having a handle section 22, which is held by the helmsman or pilot when steering the boat. A small control rope 20 spans the cockpit 12, and is attached at each end to the sides of the boat 10 near the stern, meaning the back, or aft end of the boat. This rope may be fastened to the boat sides by any conventional means, such as a rope cleat, screw eye, padeye, shackle, etc. The rope 20 passes through a tiller restraining device generally designated 18, which is fixed to the underside of the tiller 14 near its handle section 22.

Figure 2:
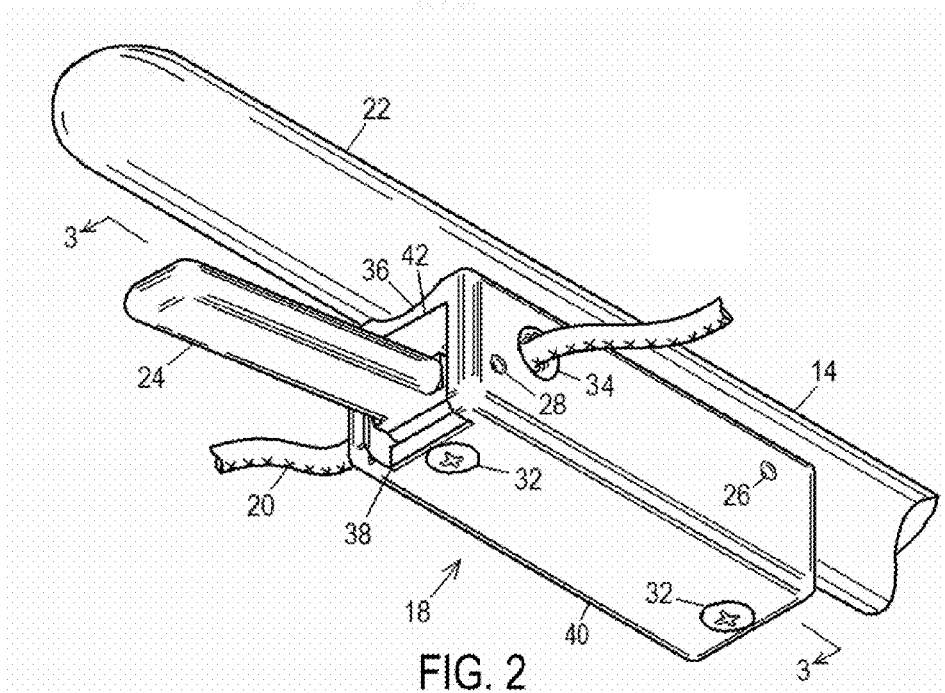
FIG. 2 is an enlarged perspective view of the boat tiller restraining device attached to the handle portion of a boat tiller.

FIG. 2 is an enlarged perspective view of the tiller restraining device 18, which has a generally rectangular, elongate hollow body or housing 40 with a full-length rectangular aperture 42 passing through it in an orientation forward to aft (rearward), with respect to the boat, and containing the internal working components of the device. In other words, the housing is generally constructed as a thick-walled rectangular tube. This housing could be made in other, more rounded hollow shapes, even as a hollow tube or it could be made as a chassis with appendages to support the working parts.

Also shown in FIG. 2, the forward end of the aperture 42 in the housing 40 contains a lever 24 that is rotatably secured with a rivet pin 28. This pin is inserted horizontally through the side walls of the housing 40 near the forward lower end of the aperture 42, and is oriented perpendicularly to the tiller 14. The forward protruding portion of the lever 24 is shaped as a small, flattened handle for manipulation by the pilot.

Figure 3:
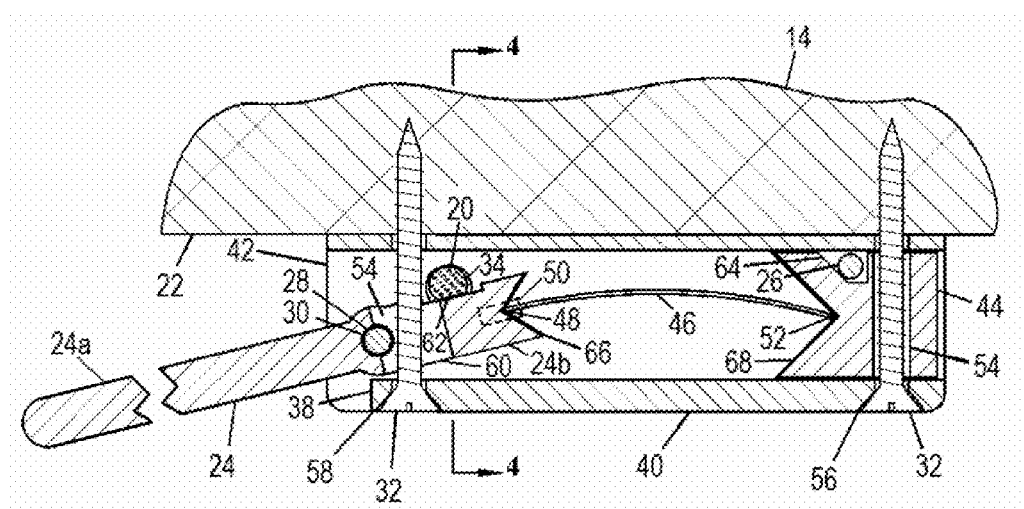
FIG. 3 is a sectional view on the line 3-3 of FIG. 2.

FIG. 3, a sectional view on the line 3-3 of FIG. 2, illustrates the internal components of the tiller restraining device 18. Internal to the device, the lever 24 extends rearward or aft beyond the pin 28 to form the short load arm 24b. This load arm terminates in a centered horizontal aft facing "V"-shape notch 48. The top surface of the load arm 24b contains a shallow recess 62. Above the load arm 24b and parallel to the pin 28, a small circular rope passage 34 transects the sidewalls of the housing 40, and is bisected by the aperture 42. The rope 20 passes through this rope passage 34 to be acted on by the load arm 24b. The lever 24 is positioned relative to the rope passage 34 so that the load arm 24b may be rotated upward between the bisected parts of the rope passage 34. With the lever in this position, the surface of the shallow recess 62 will contact the rope 20.

A single-leaf spring or slightly arched flat spring 46 applies force to the lever. A coil spring, a fiber and resin composite or a compressible elastomer spring could be used here with the same function. This spring lies in a generally horizontal position within the device. The "V" notch 48 supports and centers the forward end of the spring. The aft end of the spring 46 is held within an opposing "V" notch 52 furrowed into a spring retaining block 44. This block 44 is fixed in place within the aft end of the housing 40 by a second rivet pin 26 through the housing, which passes through a slot 64 in the upper surface of the block 44. Note that these "V" notches could have different shapes to accommodate other spring types.

A cutaway 38 in the lower forward end of the housing 40 partially exposes a reinforced pivot section of the lever 24. Thin "V"-shape stainless steel spring seats 66 and 68 shield the softer material of the lever load arm 24b and the block 44 from the working ends of the hardened spring. A small indexing pin 50 resides within the center of the notch 48. This pin is held within a shallow bore centered on the axis of symmetry of the lever 24. The indexing pin engages a small notch centered within the forward end of the spring 46 to prevent lateral slippage of the spring and subsequent scraping of the side walls of the housing 40.

FIG. 3 also shows the components that allow the tiller restraining device to be securely attached to the tiller 14. Two flat-head or oval-head wood screws or sheet metal screws 32 attach the device to the underside of the tiller 14 near its handle 22. Alternatively, a user may attach the device to the tiller by metal bands or clamps that tightly encircle both the device and the shaft of the tiller.

To accommodate the mounting screws, the lever load arm 24b is transected by a short centered, vertical slot 60 to allow passage of the forward screw 32. This slot is elongated to prevent screw contact as the lever rotates in its prescribed arc. Similarly, an oversized vertical bore 54 through the block 44 allows unobstructed passage of the aft screw 32. The extra clearance compensates for any misalignment of the block due to variations in dimensions. Countersunk bores 56 and 58 in the lower surface of the housing 40 center the screws 32 in the device. A shallow, rounded groove 36 (FIG. 2) extends the length of the top mounting surface of housing 40 to enable secure seating to tillers of round or square cross section.

For protection against the corrosive marine environment, a careful choice of materials is needed. In the preferred embodiment, the housing 40, lever 24, and block 44 are machined from custom aluminum alloy extrusions with anodized and sealed surfaces. However, other materials could be used, such as reinforced molded plastic or cast bronze, stainless steel, etc. The pins 26 and 28 are made of stainless steel for strength and corrosion resistance to prevent wear and galvanic corrosion. In the preferred embodiment, Flat spring 46 is made of hardened stainless steel, but it could also be made of carbon steel, bronze, compressible elastomers or a fiber and resin composite. A small, flanged plastic bushing 30 prevents metal-to-metal contact between the pin 28 and the lever 24, with the bushing's flange acting as a lateral thrust bearing for the lever 24.

Figure 4:
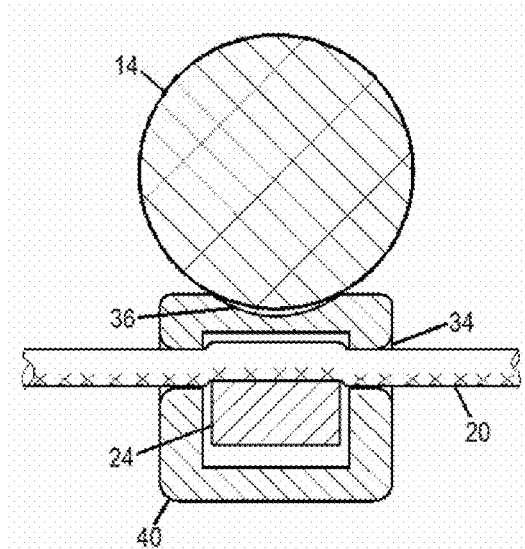
FIG. 4 is a sectional view on the line 4-4 of FIG. 3.

FIG. 4 is a sectional view on the line 4-4 of FIG. 3. This view specifically shows the engagement of the rope 20 with the rope passage 34 and the lever 24. The mounting groove 36 is evident as it allows the housing 40 to be soundly seated against a tiller handle of circular section. Alternatively, the flat surfaces adjacent to the groove 36 would are designed to securely seat to the surface a rectangular tiller handle.

Figure 5:
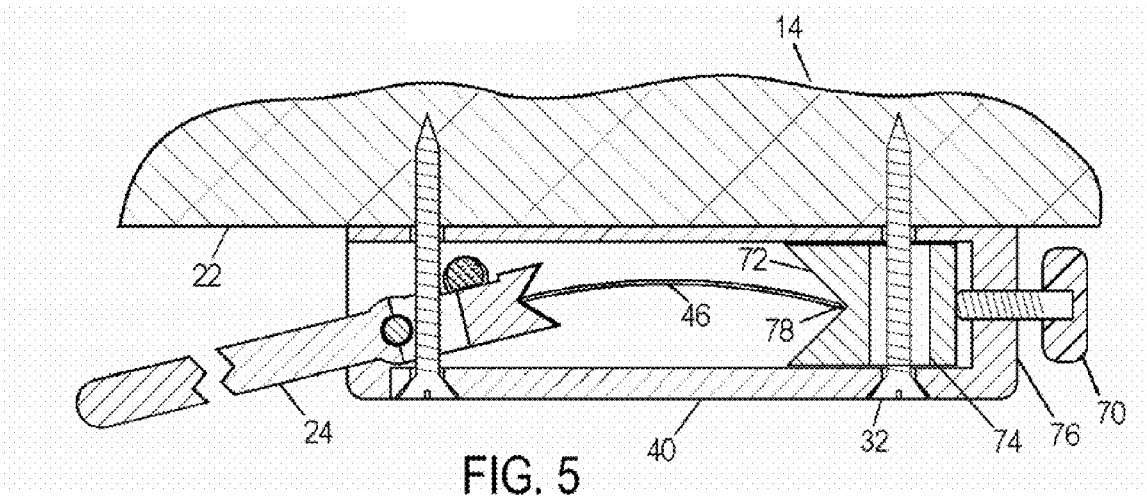
FIG. 5 is a variation of the sectional view in FIG. 3 showing a refinement consisting of a spring adjuster.

As a refinement to this preferred embodiment, the initial compression of the spring 46 can be made adjustable as shown in cross section in FIG. 5. The refinement involves making block 44 (FIG. 3) adjustable in a forward-aft direction, which is shown as block 72. The same basic shape and function of the previous block 44 (of FIG. 3) is retained. It closely fits to slide within the rectangular aperture of the housing 40 and supports the end of the spring 46. However, no rivet is used to fix the position of the adjustable block 72. Instead, the housing has an integral back wall 76 enclosing the block 72 within the housing. An adjustment screw with an integral knob 70 is threaded horizontally through this wall to contact the aft surface of the block 72. The screw knob is positioned to drive the altered block 72 forward to increase spring compression, or to allow spring force to drive the block aft. A widened slot 74 through the block 72 allows sufficient sliding movement of the block before it encounters the mounting screw 32.

OPERATION

Preferred Embodiment—FIGS. 1, 2, 3, 4 and 5

Referring to FIG. 1 and FIG. 2, the present tiller restraining device 18 provides a compact mechanism, which is essentially a unique toggling rope clutch. The mounting is simplified, requiring just two screws 32 to attach it to the underside of the boat's tiller 14. However, the device is made to allow for attachment with clamps or bands. The device is positioned with the lever 24 facing forward immediately below the handle portion of the tiller 22. This configuration enables the pilot to easily reach it with just two or three fingers while steering. The user friendly operation involves intuitive motions of the lever to engage or release the control rope 20, which is fastened across the cockpit 12. When the mechanism is engaged, it will not slide over the taut control rope 20, and the tiller 14 and rudder 16 are restrained in their current positions.

Basic user operation is as follows:

Beginning with the device engaged and the pilot of the boat holding the tiller handle in the normal steering manor, a light squeeze of the handle 24a of the lever 24 upward toward the tiller handle momentarily releases the rope 20 for quick course adjustments. Simply releasing the lever re-engages the rope to quickly fix the boat on a corrected course. For continuous free steering, a stronger squeeze of the fingers toggles the lever to remain in the disengaged position after letting go. A light downward pressure of a finger behind the lever toggles the device to re-engage the control rope and restrain the tiller again. This convenient and intuitive action exceeds the utility and speed of the prior art. However, the complexity of the system has been reduced to surprisingly few multi-functional parts.

Referring to FIG. 3, the heart of this steering accessory is a novel clutch mechanism designed to grip or release the rope 20 that passes through it. In basic function, the lever alternately compresses or relaxes the spring 46 using the corresponding spring force to alternately grip the rope 20 and maintain the "engaged" mode or to release the rope 20 and maintain the "disengaged" mode. With the rope gripped or engaged, the device is prevented from sliding over the rope. Thus, with the rope tied in place, it in turn holds the tiller in place. Naturally, when the rope is disengaged, the device is free to slide over the rope and the tiller moves freely as well.

In detail, the lever 24 pivots about its pin 28 under load from the flat spring 46. The lever operates within the aperture 42 of the hollow housing 40. The rope passage is bisected by this hollow space, so that the lever's load arm 24b can swing through the interior space, where the rope passage penetrates the side walls of the housing. With the rope in place, the load arm can encounter the rope and pinch it between the upper edges of the load arm and the upper interior edges of the rope passage. With enough spring force acting on the lever, this double pinching action is sufficient to grip the rope and prevent tiller slippage under normal rudder loads.

To provide the needed force, the spring 46 is preferably an arched flat spring, which is easily produced to exact specifications, and which terminates in straight edges that are easy to confine while being allowed to pivot under load. However, other spring types can be used successfully, as mentioned earlier. In this unique application, the flat spring functions in compression by bowing and building spring force as its ends are slightly compressed together. Simple V-shaped notches (48 and 52) confine and control the ends of this spring.

With respect to the boat, the forward-facing notch 52 in the block 44 confines the rearward or aft end of the spring 46. This block prevents vertical movement of the spring end, allowing it only to pivot within the notch. The opposing notch 48 that forms the end of the load arm carries the forward end of the spring 46. This spring end travels up and down precisely with the lever 24 as it swings in its prescribed arc. Throughout this arc, the flat spring 46 remains confined and also compressed to varying degrees. The simplified precision of this arrangement allows for the clean toggling action that makes this device so effective.

The toggling action, in turn, relies on precise geometry. The lever 24 can rotate through an arc between two stopping points within the housing. At one stopping point, the handle of the lever 24a is in its uppermost position, and the opposing load arm 24b is pressed downward against the lower wall of the housing 40. At the opposite stopping point, the handle is lowered, and the load arm is pressed upward to pinch the rope. In an intermediate position along its arc, the lever becomes aligned with both ends of the spring 46 due to the positioning of the involved components. In this position, the syitem is balanced and the spring's rotational leverage is neutralized. As the lever is manually rotated in either direction from this balance point, the spring's leverage can progressively increase. As this happens, increasing force is imparted to the lever to drive it on to the corresponding stopping point. In essence, spring leverage reverses as the lever is flipped from one stopping point to the next, thereby providing the toggling effect.

A special advantage of this mechanism is diminishing, rather than increasing, user effort. With a typical lever acting against a spring, increasing force is needed to depress the lever against the increasing counterforce of the spring. Here, however, spring leverage opposing the user diminishes as the lever is rotated toward the balance point, so effort needed by the user diminishes accordingly. Furthermore, when passing the balance point, the spring actually assists the user as its leverage is reversed and the lever is forced onward to the next stopping point. Hence, the user applies an initial effort that quickly diminishes until the lever clicks itself unassisted into the next position.

The geometry of this toggling clutch mechanism is finely tuned to maximize ease of use and mechanical efficiency. To this end, as the lever travels along its arc, its balance point is set to occur farthest from the point of rope contact. Since spring leverage increases as the lever rotates away from the balance point, the rope holding force is increased as well. However, this engagement offset is limited to prevent excessive elongation of the bowed flat spring and a loss of spring force. In this way, rope holding power is maximized, so that a reasonably light-duty spring may be used. Such a spring is very user-friendly.

When the device is disengaged, the offset balance point also helps the user re-engage it. Since this lever position is closer to the balance point, the spring has minimal leverage to resist the user. This means that minimal finger pressure is needed to re-engage the device. This light-touch engaging force is especially beneficial, since this action involves pressing the lever downward with the flick of a finger. Conversely, the somewhat greater effort needed to disengage the device is easily overcome, as the user can apply a few fingers with a more powerful gripping motion.

The refinement of including the offset balance point also helps with quick steering adjustments. When the pilot needs to quickly correct course with the device engaged, a full cycle of toggling to release and again to re-engage is unnecessary. From the engaged position, the lever has further to travel before it reaches the offset balance point. This extra travel makes it easy for the pilot to momentarily release the rope without toggling the clutch. Thus, after adjusting the tiller position, the lever may simply be released to spring back into the engaged position again.

In summary, the present tiller restraining device clearly provides a more convenient, quick, and intuitive steering restraint solution than taught by prior art. Still, several refinements are included in the present tiller restraining device to enhance its performance and make it completely user friendly.

In the preferred embodiment, to minimize friction when disengaged, the outward facing edges of passage 34 are rounded to allow the rope 20 to feed smoothly through it from any oblique angle. Conversely, the interior edges of the rope passage 34, which are used to pinch and hold the rope, remain sharp to facilitate gripping efficiency. The "V" notches 48 and 52 that retain the ends of the spring 46 are formed as open right angles to retain the spring in a precise location, yet this construction avoids binding the spring at the extremes of lever movement. These deep V's also aid in assembly by guiding the spring into place. To further maintain precise spring alignment, the block 44, which supports the fixed end of the spring, has an indexing mounting feature. The slot 64 in the upper surface of the block, which allows the pin 26 to secure it in place, has a sloping forward edge that acts to jam the block 44 against the lower wall of the housing 40 under spring pressure. This effect locks the block in place, thereby preventing any unwanted spring movement while the device is being operated.

Furthermore, to reduce user effort in working the lever 24, substantial mechanical advantage is obtained with the ratio of the lengths of the handle arm 24a to the load arm 24b ranging from 2.5:1 to 4:1. The result is that the user experiences only a few pounds of effort to overcome the strong flat spring, which can generate over 15 pounds of friction resistance in the control rope.

Some of the refinements are for practicality. In FIG. 4, the versatility of the mounting groove 36 is evident as it allows the housing 40 to be soundly seated against a tiller handle of circular section. Alternatively, a rectangular tiller handle can contact the flat surfaces adjacent to the groove for a secure, flush fit.

Other refinements are included in the interest of safety. The mechanism is carefully designed to grip the control rope 20 with roughly 15 pounds of resistance to prevent slippage under normal boating conditions, yet at this holding level any crew can readily overpower the device without excessive force in an emergency situation. A substantially greater holding resistance could be difficult to overpower and could also contribute to rudder damage as it would not yield to the lateral force of a large wave impact. Another safety feature is the cutaway 38 in the lower forward end of the housing 40, which eliminates a potential pinching hazard between the housing and the lever 24. Furthermore, all edges of the device are well rounded for user comfort and to minimize injury from bumps and bangs typical of life aboard a moving boat.

To improve performance and convenience, the toggling mechanism is precisely balanced. The relative positions of the lever pivot pin 28 and the spring support notch 52 with respect to the rope passage 34 and housing 40 are carefully arranged to facilitate the optimum holding and toggling forces and stopping points for the lever 24. This precise arrangement places the balance point of the lever closer to its disengaged position than to its engaged position. This offset, in turn, affords greater spring leverage and resulting holding force against the rope while engaged. For disengaging the device, the user's hand squeezes the lever upward toward the tiller handle. This powerful manual action easily overcomes the maximized holding force to release the rope. Conversely, the offset balance point produces a much lighter resistance to toggling the lever back downward for reengaging the rope. Thus, a light downward flick with the back of a finger can instantly engage, and restrain the tiller whenever needed. In refining the balance point, the depth of recess 62 has been adjusted to allow full rope contact before the lever bottoms out against the interior surfaces of the housing 40, to maintain the full holding effect.

As an additional refinement, a spring force adjuster may be added to reduce lever effort when full tiller-holding power is not needed. FIG. 5 shows an optional screw knob 70, which can be rotated to allow the modified block 72 to slide slightly outward to relax the spring 46. This minimal adjustment would be sufficient and more comfortable for the pilot when sailing in light conditions. In heavier weather, the knob could be re-tightened to fully compress the spring for maximum rope grip as designed.

DESCRIPTION

Figure 6:
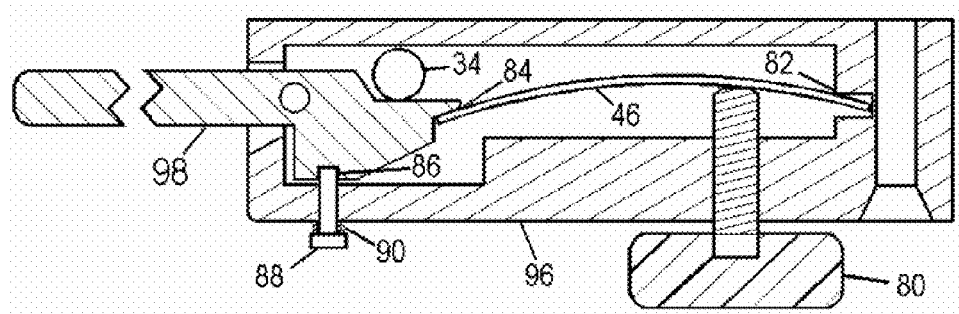
FIG. 6 is a variation of the sectional view in FIG. 3 showing an alternate embodiment having a spring adjuster and a lever stop pin.
Figure 7:
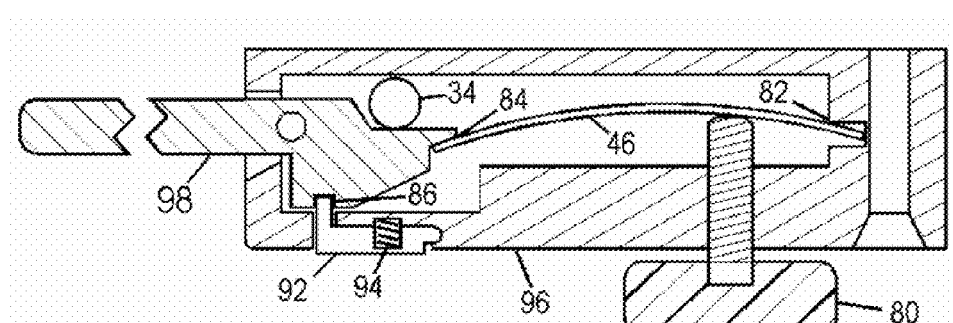
FIG. 7 is variation of the sectional view in FIG. 3 showing an alternate embodiment having a spring adjuster and a lever stop pawl.

Alternative Embodiment—FIGS. 6 and 7

FIG. 6 shows a cross section of an alternative embodiment of the present invention. Here, the modified lever 98 has a shape and function similar to that of the preferred embodiment so that it may be pivoted to obstruct the rope passage 34. However, the internal portion of the lever is enlarged near the lower surface of the housing 96, where it has a downward-facing stop notch 86. A spring-loaded stop pin 88, retractable by force from a small spring 90, penetrates the underside of the housing. The stop notch 86 is positioned to align with the stop pin 88 when the lever is moved nearly to its disengaged position.

Alternatively, FIG. 7 shows a small pivoting, spring-loaded stop pawl 92 with a similar function. In FIG. 6 and FIG. 7, a screw knob 80 is threaded upward through the underside of the housing 96 near the rearward or aft end of the spring 46. The screw knob 80 is positioned and sized to be manually rotated until it contacts and displaces the spring 46. The spring 46 is supported in FIG. 6 and FIG. 7 by the support notch 84 on the aft end of the lever and by the rear support notch 82, which is fixed and integral to the housing 96. Construction and materials are the same as for the preferred embodiment.

OPERATION

Alternative Embodiment—FIGS. 6 and 7

The two versions of an alternative embodiment shown in sectional views FIG. 6 and FIG. 7 function similarly to the preferred embodiment. The pilot manually squeezes the lever against spring force to disengage the rope and allow free steering. The primary difference is that the lever and flat spring arrangement do not toggle. Instead, the flat spring 46 is situated to only force the lever into the rope-gripping position. When the lever is squeezed and released, it will return to the engaged position.

To keep the lever disengaged from the rope when released by the pilot, an additional feature is included. With the lever fully squeezed upward into the released position, the stop pin 88 of FIG. 6 or stop pawl 92 of FIG. 7 may be pressed upward so that it engages the stop notch 86 in the lever 98. As the lever is released, it is bound in place by the stop pin or stop pawl, which is, in turn, bound within the notch by the force of the lever. The lever will then remain disengaged from the rope to allow normal steering. When the lever is again squeezed by the pilot, the pin or pawl becomes unbound, and its small spring withdraws it from the notch in the lever. Then, as the pilot releases the lever, it is released to return to the engaged position. A tiny tab (not shown) on the interior edge of the pin or pawl prevents complete retraction and loss of the small part.

In these alternative embodiments, gripping power on the rope is made adjustable by means of the screw knob 80. The screw knob contacts the spring close to the aft support notch 82, so that screwing the knob inward torques the spring upward, increasing the bow over the length of the spring. This bowing increases spring pressure at its other end where it contacts the lever. Conversely, unscrewing the knob reduces pressure to the lever. With this adjustability, the screw may be set for a lighter gripping force for mild sailing conditions and easier lever work, or for a progressively firmer gripping force for increasing weather conditions. Since the lever releases the rope independently of the screw knob setting, a desired setting is never lost by disengaging the rope.

CONCLUSION, RAMIFICATIONS, AND SCOPE

Accordingly, the present invention provides a highly reliable tiller restraining device that enables the pilot of a boat to instantly, single-handedly and safely secure its tiller in any position, and further, to make quick adjustments as a natural part of the steering process. The advantages of this device can prove vital in crowded or rough conditions, when quick actions are necessary.

While the above description contains many specificities, these should not be construed as limitations on the scope of the invention but rather as exemplifications of the presently preferred embodiments thereof. Many other ramifications and variations are possible within the teachings of the invention. For example, on the internal end of the lever, the shallow recess that engages the control rope can be enlarged to completely encircle the rope, or even be made as a separate part acted on by the lever while exhibiting the same pinching effect to the rope. The housing could be made as a simple frame or base with appendages to support the working parts. The dimensions given pertain to the preferred embodiment, but other sizes and dimensions may be applied to the invention without altering its unique function, as long as the relative geometry remains consistent. Also, the parts could be made of different materials including reinforced plastics, fiberglass or other metals. Further, the device could be mounted elsewhere on a boat to control slippage of the rope for other purposes, including restraining the position of an outboard motor. Thus the scope of the invention should be determined by the appended claims and their legal equivalents, and not be limited by the examples given.

I claim:

1. A tiller restraining device to be used on a boat that is steered with a tiller for selectably securing said tiller in any position along its steering arc, with a rope substantially taut crossing the steering area being attached to opposite sides of the cockpit, said tiller restraining device having means of attachment to said tiller, the device comprising a rope clutch to grip or release said rope passing therethrough to restrain or free the movement of said tiller, said rope clutch having an integral manually-operated lever with pivot means, said lever having a load arm internal to the device, said rope clutch having a substantially horizontal rope passage, said lever having a first position wherein said load arm pinches and restrains said rope from axial movement within said rope passage and said lever having a second position wherein said rope is liberated to slip unrestrained through said rope passage, the device also having an internal spring that acts on said load arm to aid the restraint of said rope, one end of said spring being restrained within the device, the other end of said spring engages the end of said lever's load arm to pivot therewith.

2. The tiller restraining device of claim 1 wherein said spring is positioned such that in an intermediate position along the arc of said lever's rotation, the ends of said spring lie in alignment with the lever's pivot point whereby the lateral component of the spring's force upon said lever is equilibrated such that spring-induced lever motivation will reverse as said lever rotates between said first position and said second position, and said spring will act to restrain said lever in either said first or second position.

3. A tiller restraining device to be used on a boat having a tiller as steering means for selectably restraining said tiller in any position, said tiller restraining device comprising:
  (a) a substantially taut rope passing through the device and being attached to each side of the boat across the steering area to opposite sides of the cockpit, said rope being selectably gripped or released by the device to respectively inhibit or allow lateral tiller movement,
  (b) an elongate frame or hollow body having means of attachment to said tiller in a substantially parallel orientation thereto, said hollow body having an aperture, and having a circular horizontal rope passage transecting the body substantially perpendicular thereto and intersecting said aperture, said rope passage being sized to allow slippage of said rope therethrough,
  (c) a lever having a pivot point, said lever having a first position, and a second position and being pivotably mounted within said aperture, said lever having a handle arm extending outwardly from said pivot point beyond said hollow body to form a handle for user interaction, said lever also having an opposing load arm extending inwardly from said pivot point with respect to said hollow body, the axis of said pivot point being substantially parallel to said rope passage and being positioned with respect thereto such that, with said lever in said first position, one edge of said load arm is interposed between the bisected portions of said rope passage such that the load arm impinges the axial movement of the rope through said rope passage by pinching the rope against the interior edges of said rope passage being formed by the rope passage's intersection with said aperture and thereby inhibiting rope slippage and subsequently restraining said tiller, and with said lever being moved to said second position, said load arm is displaced from said rope passage thereby allowing free slippage of said rope so that said tiller is unrestrained, (d) a spring having a first spring end and a second spring end and being positioned within said hollow body to impart a force between a point within said hollow body and said lever such that spring force acts to aid the action of said lever with respect to the impingement of said rope, and a first notch being located within the end of said load arm to support said first spring end and to make it movable with said lever and a second notch being located within said hollow body substantially opposing and facing said first notch to retain said second spring end, said spring being partially compressed and secured between said first and second notches.

4. The tiller restraining device of claim 3 wherein said spring is an arched leaf spring or flat spring comprising at least one leaf.

5. The tiller restraining device of claim 3 wherein said spring is a coil spring.

6. The tiller restraining device of claim 3 wherein said lever has a balance point intermediate to said first and second positions due to the orientation of said second notch relative to said pivot point, such that both spring ends lie in alignment with said pivot point, whereupon the lateral spring force imparted to said lever is equilibrated, so that a rotation of said lever between said first and second positions will reverse the spring leverage imparted to said lever as it rotates past said pivot point, thereby causing spring force to restrain said lever in either position, this action enabling the user to toggle the mechanism between said first position and said second position, with said spring providing both the toggling action and the rope restraining force.

7. The tiller restraining device of claim 6 wherein said spring is an arched flat spring or leaf spring comprising at least one leaf that is compressible by an axial load acting on the ends of said spring, which acts to increasingly bow the flat spring as it is compressed.

8. The device of claim 6 further including an adjustment screw and also a block that is slidable within said hollow body, said block containing said second notch to make it moveable in proximity to said lever, said adjustment screw being threaded through a wall of said hollow body and being oriented substantially horizontally such that it can be used to motivate said block to alter the relative separation of said first and second notches thereby changing overall spring compression, and thus altering the pinching force imparted to said rope when engaged.

9. The tiller restraining device of claim 3 further including a manually operated locking pin penetrating a small aperture within said hollow body, said spring being positioned to solely urge said lever toward said first position to impinge said rope, said locking pin being located such that it may be inserted to hold said lever in said second position such that said tiller restraining device may slide freely with respect to said rope.

10. The tiller restraining device of claim 3 further including a manually operated stop pawl within a recessed aperture in said hollow body, said spring being positioned to solely urge said lever toward said first position to impinge said rope, said stop pawl being located such that it can be used to hold said lever in said second position such that said tiller restraining device may slide freely with respect to said rope.

11. The tiller restraining device of claim 4 further including an adjustment screw threaded through a wall of said hollow body being positioned in substantially perpendicular contact with said flat spring, said first spring end being supported by a fixed ledge or notch within said hollow body and said second spring end engaging said lever's load arm to motivate it toward said first position, said adjustment screw pressing on an intermediate point of said flat spring such that said adjustment screw can be used to alter said spring's pressure against said load arm to increase or decrease said lever's holding force imparted to said rope.

12. A rope clutch device for control ropes on sailboats having attachment means to any hard surface of a sailboat, said rope clutch having an integral manually-operated lever with pivot means, said lever having a load arm internal to the device, said rope clutch having a rope passage, said lever having a first position wherein said load arm pinches and restrains the rope within said rope passage and said lever having a second position wherein said rope is liberated to slip unrestrained through said rope passage, the device also having an internal spring that acts on said load arm to aid the restraint of said rope, the device further exhibiting a toggling action wherein said spring is attached to the end of said lever's said load arm to pivot therewith and being positioned such that, with said lever in an intermediate position between said first and second positions, the ends of said spring lie in alignment with the lever's pivot point, whereby the lateral component of the spring's force is equilibrated such that spring-induced lever motivation will reverse directions as said lever rotates between said first position and said second position, and said spring acts to restrain said lever in either position, said toggling action enabling the required manual effort upon said lever to diminish as said lever is motivated from said first position to said second position or from said second position to said first position.

* * * * *